Dec. 3, 1929. C. EHRET 1,737,576
COVER LOCK
Filed Aug. 7, 1928

Conrad Ehret INVENTOR
BY Loyal J. Miller
ATTORNEY

Patented Dec. 3, 1929

1,737,576

UNITED STATES PATENT OFFICE

CONRAD EHRET, OF OKLAHOMA CITY, OKLAHOMA

COVER LOCK

Application filed August 7, 1928. Serial No. 298,099.

My invention relates to improvements in locking means for bail members to thief hole covers, and the like.

The object of my invention is to produce a device of the character described which will be new, novel, useful and of utility; which will be simple, strong, durable, and easily attached to the bail of a thief hole cover, and the like, easily and cheaply constructed and manufactured, that will be accessible at any time to be quickly and easily locked; and that will securely lock the thief hole cover, and prevent opening unless unlocked.

Figure 1:
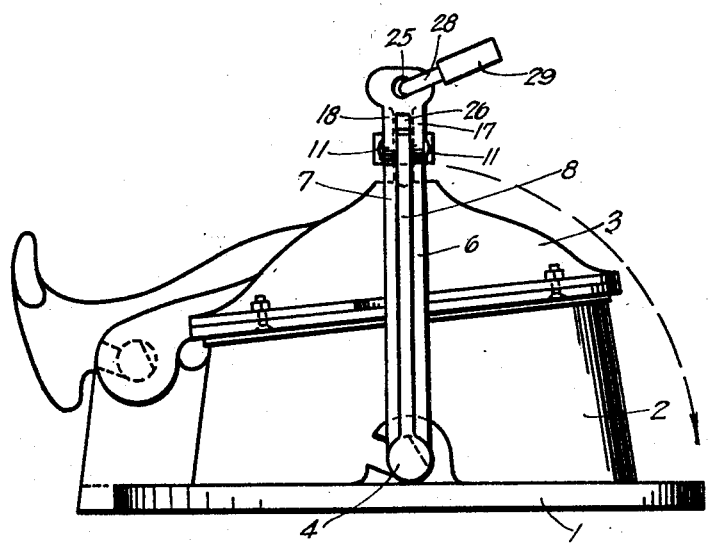
Figure 3:
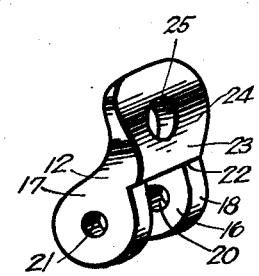
Figure 2:
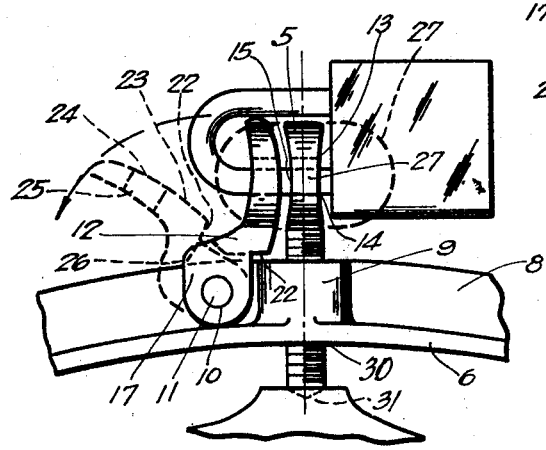

The invention, novel features, and other objects and advantages will be set forth in the ensuing description, specification, claims and accompanying one-sheet drawing, of which, Figure 1 is an elevational view of a thief hole cover showing the bail in place and the locking means attached; Fig. 2 is a fragmentary elevational view of a portion of the bail and the locking means, showing the open position of the clasp and a front view of the thumb-screw in dotted line portion; Fig. 3 is a perspective view of the clasp, detached.

Like characters of reference designate like parts in all the figures.

The manner of accomplishing the purposes for which my invention is intended is as follows:

It is intended the locking means may be applicable to any bail, but it is especially intended to be applicable to a bail and thumb-screw as is described herein and illustrated in the accompanying drawing.

My device is particularly adapted to apply to a closure for thief holes adapted to be fastened over an opening in a tank, or the like, 1, such as is shown in the drawing, having a stand-pipe 2 and a top 3 fitting over said stand-pipe, a bail clamping member 4 adapted to be clamped over both said stand-pipe 2 and said top 3, and a thumb-screw bolt 5, the lower portion of said bolt being threaded and adapted to fit a similarly threaded portion in the upper central portion of said bail member 4. The lower end of said screw bolt is adapted to be screwed into an inverted thimble shaped depressed portion in the upper central portion of said top 3.

It will be observed from the drawing that the bail member 4 has, preferably, flattened portions 6, 7, on its outer edges, and a raised rib portion 8 centrally therebetween on its outer central portion; it also is formed with a boss 9 in its upper central portion to strengthen the bail member and admit of a threaded hole being placed therethrough to receive said screw-bolt 5. In the central ribbed portion 8 of said bail 4 near one side of said boss 9 is a perforation 10 therethrough adapted to admit a rivet 11 and to fasten to said bail member 4 a clasp or rider 12 hereinafter more particularly described. The upper part of the thumb portion of said thumb screw-bolt 5 is perforated at 13 to admit of the insertion therethrough of the shackle 28 of a lock 29. Said thumb portion is concave on each side surface thereof, 14, 15, to assist in the use of said thumb-screw. The clasp, or rider, 12 is made of metal, or other suitable material; its lower portion is bifurcated, forming two round shaped shoulders 16, 17, with front rounded shoulders 18, 19; each of said bifurcated portions has a perforation as shown respectively at 20, 21, to admit said rivet 11. A shoulder 22 above said rounded shoulders 18, 19, forms the lower part of the front convexed face 23 of said clasp 12. It is so convexed as to adapt its convexed portion 34 to fit one of the central concave surfaces 14, 15, of said thumb portion of said screw-bolt 5 when closed with it for locking. A perforation 25 through the center of said convexed portion 24 and at right angles to the perforations 20, 21, in the lower bifurcated portions, is adapted to be used when in a locking position conjugately with the perforation 13 in said screw bolt 5. The division 26 between the bifurcated shoulders 16, 17, of the lower portion of said clasp 12 extends sufficiently high on the back surface thereof to permit said clasp 12 when not in a locking position to partially rotate on the rivet 11 and permit it to be laid back resting said division 26 on the rib portion 8 of said bail member 4. Said action permits the unscrewing of the screw-bolt 5 and the consequent releasing of the top 3 from the standpipe 2, and prevents said front face 23, 24 from interfering with the unscrewing and screwing up of said thumb-screw bolt 5, and from contacting the outer edge 27 of said thumb-screw bolt. A lock 29 with a shackle 28 of known form may be used through perforations 13 in the head of the thumb-screw bolt and 25 in said clasp to securely lock said members together. It is also intended when desired to permit the wiring of these two members through said perforations and the sealing of the ends thereof together.

In operation, the top 3 is placed tightly over stand-pipe 2 of closure 1, and the bail member 4 is placed in an upright position thereover; thumb screw-bolt 5 is then screwed into perforation 30 in said boss 9 of said bail 4 and into the depressed portion 31 of said top 3. The head of the thumb screw-bolt 5 is screwed sufficiently tight to securely hold said top 3 on said stand-pipe 2, and to permit one of the concave surface sides 14 or 15 of said head to fit the convexed surface face 23, 24, and to place conjugately the perforations 13 and 25 through said screw-bolt 5 and said clasp 12. The clasp 12 is then raised from its open position to an upright one until faces 15 and 23 fit closely together; a shackle 28 of a lock 29 is then placed through said conjugate perforations and the lock locked. To unlock and remove the top the procedure is reversed. When the screw-bolt 5 has been loosened from the depression 31 the bail member 4 may be lowered along the dotted line shown in the drawing, and the top 3 removed from contacting the stand-pipe 2 by the use of the foot-hold (not numbered).

From the description of the accompanying one-sheet drawing, the specifications and claims, the advantages of construction, manufacture, and application of the invention will be apparent to those skilled in the art to which my invention relates. I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of the parts, inasmuch as the future practice of the invention may reveal the necessity of a change and modification, and I reserve the right to make all such as fall within the scope of my invention as defined by the appended claims.

At times it may be desirable to not only lock the device, but also to seal it with a seal, for checking definitely whether the lock has been opened or not. If the seal only was used it could be broken and the contents of the tank extracted. If the lock only was used the lock might be picked, or unlocked and the contents of the tank extracted and the lock again locked without knowledge of such facts being revealed; but if the lock and sealing means were both used the breaking of the seal would reveal the fact some one had opened the tank. It would be useless for anyone to break the seal without first being able to unlock the lock.

The specification and drawing are to be considered illustrative and not restrictive.

Having thus described the invention, what is claimed and desired to be secured by Letters Patent, is:

1. In a cover lock, the combination with a bail member pivoted to a tank top, and a thumb screw holding said bail and a tank hole cover together, said bail member and said thumbscrew member adapted to clamp said cover to said tank top, of a clasp having a rounded bifurcated perforated portion pivotally riding said bail member and having an upstanding portion with a central perforation alined with a perforation in the head of said thumbscrew, said perforations for receiving a locking means.

2. A device, as described, comprising a clasp adapted for fastening to a bail member for securing a tank hole cover to a tank top, said clasp being adapted to co-act with a thumbscrew for holding and locking said bail and said tank hole cover together, said clasp having rounded bifurcated perforated shoulders for pivotally riding and seating on said bail member, and having an upstanding portion with a central perforation therethrough for aligning with a perforation in the head of said thumbscrew, said perforations for receiving a locking means for securely locking said clasp and said thumbscrew together.

3. The combination with a sealing means, a bail member adapted for fastening a tank hole cover to a tank top, a thumbscrew for holding said bail and said tank hole cover together, said thumbscrew having a central perforation through its head, of a device of the class described, comprising a clasp having a rounded bifurcated perforated portion for pivotally riding and seating on said bail member, said clasp having an upstanding portion with a central perforation aligning with a perforation in said thumbscrew head, said perforated clasp and said perforated thumbscrew adapted for sealing with a sealing means against unauthorized opening of said tank hole cover.

4. A device of the class described comprising a clasp adapted for fastening to a bail member for securing to a tank hole cover, and to co-act with a thumbscrew having a central perforation through its head for holding and sealing said bail and said tank hole cover together by a sealing member, said clasp having a rounded bifurcated perforated portion for riding said bail member, and for pivotally anchoring on said bail member, said clasp having an upstanding portion with a central perforation for aligning with the perforation in said thumbscrew head, said clasp and said thumbscrew head adapted for sealing by said sealing member against unauthorized opening of said tank hole cover.

5. A device of the class described, comprising a clasp having a rounded bifurcated perforated portion for riding a bail member, a bail member adapted for holding a tank hole cover to a tank, said clasp having an angular shoulder in the channel of said bifurcation adapted when said clasp is opened for seating on said bail member, said clasp being pivotally anchored to said bail member through aligned perforations, and having an upstanding portion with a central perforation therethrough, a thumbscrew member adapted to hold said bail and the top of said tank hole cover together, an angular shoulder in said clasp for seating of said clasp on said bail in an open position, a second angular shoulder across the bottom of the front face of said upstanding portion for seating on and forming a stop against said bail member when said clasp is fully closed in an upright position, said clasp and said thumbscrew adapted to be locked securely together.

6. A device of the character described, comprising a metallic clasp member having a convex upper face and a central perforation therethrough, and having bifurcated rounded shoulders therebelow each shoulder having a central transverse perforation, a bail member adapted for holding a tank hole cover tightly to a tank, said bail member having an internally threaded boss in its central portion, a thumbscrew member having concave faces adapted to fit said convex upper face and threadedly fit said internal threaded boss, said clasp being pivoted to said bail member, said thumbscrew member adapted for holding the top of said tank hole cover and said bail member together and having a transverse perforation in its head for aligning with the central perforation in said clasp, said clasp and said thumbscrew member adapted to be locked securely together.

CONRAD EHRET.